3,361,692
ETHYLENE/VINYL ACETATE COPOLYMER AND COAL TAR PITCH OR PETROLEUM PITCH COMPOSITION

Robert E. Parkinson, Monroeville Borough, Allegheny County, Pa., assignor to United States Steel Corporation, a corporation of Delaware
No Drawing. Filed Sept. 3, 1963, Ser. No. 306,289
4 Claims. (Cl. 260—28.5)

This invention relates to improved resin-pitch compositions. More particularly, it relates to such compositions comprising substantial proportions of pitch in admixture with a copolymer of ethylene and vinyl acetate, to provide low-cost thermoplastic materials that are strong, flexible, durable and are characterized by good adhesion when bonded to metals and other materials.

Many types of resins have heretofore been added to a coal-tar pitch in order to take advantage of its low-cost and durability and to overcome its mechanical weakness, brittleness and poor adhesion. Some resins, such as polyethylenes, may in themselves possess many desirable properties but have difficulty in adhering strongly to metals or other substrates. Other resins have good adhesive properties but lack strength and durability or are more costly.

The compositions of invention possess the desirable properties of ethylene-vinyl acetate copolymers and of pitch. Additionally, some enhanced or synergistic properties have been found. Hence, my compositions may be used as moldings, extrusions, films, coatings, and adhesives for bonding to substrates, including metals. Among many desirable properties, these compositions possess durability, inertness, resistance to moisture, weathering and chemical action, as well as having high strength, elongation, and flexibility. By prestretching these compositions, molecular alignment takes place which results in increased tensile strength.

The ethylene-vinyl acetate copolymers or resins suitable for the purposes of this invention are those copolymers having a polymerized vinyl acetate content of from about 5% to about 50% by weight, preferably from about 18% to about 40% by weight. These copolymers may vary in melt index from about 0.2 to above about 1000. The melt index is a measure of the flow of polymers under specified conditions of temperature and pressure that varies inversely and exponentially with the molecular weight. The melt index affects mixing and blending. It may be chosen depending on the properties desired in a resin-pitch composition. Copolymers having substantially the same polymerized vinyl acetate contents may vary rather widely in their melt indexes. For example, the commercially-available 27–29% vinylacetate copolymers useful in my compositions have melt indexes that vary from about 2.5 to about 175.

A pitch suitable for the purposes of the invention may be derived from coal tar or petroleum. These pitches range in ring-and-ball softening points from about 40° C. to about 190° C. The softening points of the constituents are also related to the softening points of the compositions and thus determine the temperature range wherein a composition may be used. A higher softening point composition is preferred where high heat resistance in service is required. A lower softening point composition is preferred to provide good adhesion at lower bonding and service temperatures.

The resin-pitch compositions are prepared by mixing and heating from about 0.1% to about 75% by weight of the composition of a pitch and from about 99.9% to about 25% by weight of ethylene-vinyl acetate copolymer. These compositions may be prepared by hot mixing. When the copolymer and the mixed compositions exhibit high viscosity, it is desirable to blend the components by the use of high-shear mixing equipment such as a roller or rubber mill, a Banbury mixer or a screw-type extruder. The temperature required for mixing will depend on the softening points of the components and the type of equipment being used for mixing. The mixing conditions will also affect the tensile strength of a composition to a degree. In general, blending of the constituents is easier when their softening points are in approximately the same range. Satisfactory compositions have been obtained with differences in softening points as great as 80° C. However, it is easier to obtain homogeneous mixtures when the softening points of the constituents are closer together preferably ±10° C., especially in compositions containing over about 40% pitch.

Excellent properties, for example, in tensile strength, tear resistance, heat resistance and adhesive strength result from the combination in the crotch of a rubber mill of a mixture of 40% of a high-softening-point coal-tar pitch with 60% of a high-molecular-weight ethylene-vinyl acetate copolymer (proportions by weight). The pitch may have a softening point of about 134° C. The copolymer may comprise about 27–29% vinyl acetate having a softening point of about 150° C. and a melt index of about 3. This composition has a higher tensile strength and tear resistance than the copolymer alone. The described properties will vary somewhat with the mix proportions. A higher tensile strength will result with a 25:75 pitch to copolymer weight-ratio mix. Increasing hardness and heat resistance will result with higher pitch content, for example, with a 60:40 pitch to copolymer weight-ratio mix. With a 75:25 pitch to copolymer weight-ratio mix the properties of the composition will be poorer and unsatisfactory for many applications.

The usual quantities of commercial filler materials may be blended in with my composition. These fillers may comprise such finely divided materials as carbon black, powdered metals, silicates, metallic oxides, clay or the like. Their addition can improve such composition properties as heat resistance, chemical resistance, color, adhesion, hardness, and viscosity. However, adhesive shear strengths generally vary inversely with the amount of filler admixed.

A complete understanding of the invention may be obtained from the following typical examples of process showing how the compositions are made and some of the properties thereof. The designated properties were determined by standard ASTM methods.

Examples 1–6

Sixty parts by weight of an ethylene-vinyl acetate copolymer comprising about 18% by weight vinyl acetate and 40 parts by weight of a coal-tar pitch having a ring-and-ball softening point of about 94° C. were placed in the crotch of a rubber mill, comprising two horizontal rolls turning toward each other, with a narrow slot therebetween. The rolls were preheated to a temperature of about 90° C., a temperature at which the components were softened, but lower than their softening points. After the components were softened, the roll temperature was reduced to between about 40° and 50° C. to permit stripping of the composition from the rolls and thorough blending by working. This example was repeated as Examples 2-6 to illustrate the wide choice possible as to copolymer and pitch. More particularly, in Examples 1-6, there are illustrated the wide variations possible in melt index, softening point and ratios of vinyl acetate in the copolymers and in the softening points of the pitches. To avoid too many variables, the resin-pitch ratios were kept constant at 60:40. These examples show that any available ethylene-vinyl acetate copolymer and any pitch having a softening point not too far removed from that of the copolymer can be blended to form a useful composition, some compositions being superior to others. The respective proportions and properties of each copolymer resin and pitch and the adhesive strength of each composition are summarized in Table I.

Example 17

Fifty-seven parts by weight of an Example 3 resin comprising about 28% vinyl acetate in the copolymer and having a melt index of about 3 and forty-three parts by weight of a coal-tar pitch having a 111° C. softening point were placed in the hopper of a screw extruder. In their dry state, the components were fed by the rotating screw through a barrel heated to between about 177° and 190° C. The components were thoroughly blended, then forced through a die at the end of the barrel. The extruded rod (approximately 3/16" in diameter) had a tensile strength of about 4000 p.s.i., which was approximately double the 1846 p.s.i. tensile strength of a somewhat comparable composition of Example 9, of a different con-

TABLE I

| Example | Copolymers and Properties | | | Pitch Softening Point, ° C. | Composition Blend | | Adhesive Strength p.s.i., Lap Shear |
|---|---|---|---|---|---|---|---|
| | Percent Vinyl Acetate | Softening Point, ° C. | Melt Index | | Resin, Wt. Percent | Pitch, Wt. Percent | |
| 1 | 18 | 99.5 | 150 | 94 | 60 | 40 | 278 |
| 2 | 24 | 134 | 15 | 112 | 60 | 40 | 337 |
| 3 | 28 | 151 | 3 | 143 | 60 | 40 | 456 |
| 4 | 28 | 117 | 15 | 112 | 60 | 40 | 345 |
| 5 | 33 | 118 | 30 | 112 | 60 | 40 | 251 |
| 6 | 40 | 105 | 30 | 94 | 60 | 40 | 380 |

Examples 7-16

Compositions were prepared in the equipment and according to the method of Example 1. Examples 7-16 illustrate changes in a number of composition properties effected by changes in the resin, the pitch, the pitch softening point and the resin pitch ratio in the blend. In Examples 7-12, an Example 3 resin was used comprising about 28% by weight vinyl acetate in the copolymer and having a melt index of approximately 3. In Examples 13-16 an Example 4 resin was used, comprising about 28% by weight vinyl acetate in the copolymer and having a melt index between about 10 and 15. Coal-tar pitches were used in all the examples except Example 10 where a pitch derived from an asphalt-base petroleum was used. For a further comparison of properties, in Examples 7 and 13, the resin only was processed. The materials in the compositions and certain properties of the compositions are summarized in Table II. It will be observed that synergistic effects are found in increased softening points and tensile strengths of the compositions.

figuration blended in a rubber mill. Upon stretching the extruded rod about 750% so that a prestrengthening due to molecular alignment occurred, its tensile strength was increased from about 4000 p.s.i. to about 11,370 p.s.i.

Examples 18-23

Compositions were prepared in the equipment and according to the method of Example 1. The Examples 18-23 illustrate the admixture of a number of representative filler materials with resin-pitch compositions and the adhesive shear strengths of the resulting compositions. In each example, the resin was an Example 3 resin comprising about 28% vinyl acetate in the copolymer and having a melt index of about 3. The pitch was a coal-tar pitch having a softening point of about 150° C. For comparison, in Examples 22 and 23 no filler material was used. The materials in the compositions, the proportions thereof in percent by weight and the lap-shear adhesive strengths of the respective compositions are summarized in Table III.

TABLE II

| Ex. | Composition Blend | | | Properties of the Compositions | | | | | | | | |
|---|---|---|---|---|---|---|---|---|---|---|---|---|
| | Resin, wt. Percent | Pitch, wt. Percent | Pitch Softening Point, ° C. | Tensile Strength, p.s.i. | Elongation, Percent | Tear Resistance, lb./in. | Adhesive Strength p.s.i., Lap Shear | | Softening Point, ° C. | Melt Index | Brittleness, ° C.[1] | Hardness (Shore) |
| | | | | | | | Galvanized Steel | Carbon Steel | | | | |
| 7 | 100 | | | 1,651 | 2,971 | 192 | 625 | 600 | 151 | 3 | −80 | 79 |
| 8 | 75 | 25 | 134 | 2,395 | 2,513 | 284 | 496 | 478 | 142 | 7 | −70 | 89 |
| 9 | 60 | 40 | 143 | 1,846 | 2,103 | 278 | 465 | | 167 | | | |
| 10 | 60 | 40 | 112 | 1,695 | 1,090 | 232 | 367 | 348 | 177 | 5 | −20 | 94 |
| 11 | 50 | 50 | 134 | 1,181 | 1,613 | 231 | 540 | 124 | 159 | | (2) | |
| 12 | 25 | 75 | 134 | | | | 167 | | | | | |
| 13 | 100 | | | 865 | 2,640 | 143 | 579 | 460 | 117 | 10 | −80 | 75 |
| 14 | 75 | 25 | 104 | 1,739 | 2,583 | 263 | 460 | 426 | 148 | 33 | −60 | 88 |
| 15 | 50 | 50 | 104 | 651 | 772 | 150 | 322 | 361 | 172 | | −30 | 94 |
| 16 | 25 | 75 | 104 | | | | 145 | 37 | 129 | | −20 | |

[1] Passed test at indicated temperature.
[2] Failed at +30° C.

TABLE III

| Ex. | Filler Material | Filler wt. percent | Pitch wt. percent | Resin wt. percent | Adhesive Strength p.s.i. Lap Shear |
|---|---|---|---|---|---|
| 18 | Carbon Black | 33⅓ | 33⅓ | 33⅓ | 289 |
| 19 | Aluminum Silicate | 33⅓ | 33⅓ | 33⅓ | 294 |
| 20 | ----do---- | 20 | 40 | 40 | 383 |
| 21 | Hydrated Aluminum Oxide | 20 | 40 | 40 | 377 |
| 22 | | 0 | 50 | 50 | 540 |
| 23 | | 0 | 40 | 60 | 456 |

*Example 24*

A composition was prepared in the equipment and according to the method of Example 17, using a 60% resin to 40% pitch ratio by weight. The resin was an Example 3 resin comprising about 28% vinyl acetate in the copolymer and having a melt index of about 3. The coal-tar pitch had a softening point of about 143° C. The resulting composition strip about 0.030" thick by 1 inch wide was placed between the mating surfaces of frames of commercially available galvanized steel and gypsum wallboard. Heat was applied to the steel frames for a sufficient time to raise the temperature of the assembled joint to about 210° C. under a contact pressure to bring the surfaces into contact with the adhesive. After cooling to room temperature, a high strength bond was obtained between steel and wallboard. In testing the joint strength in tension, failure occured within the wallboard and not in the adhesive or at the adhesive-adhered interfaces. Exposure of the samples to moisture (120° F. 100% relative humidity for 7 days) appeared to have no effect on the adhesive bond, although it corroded the exposed galvanized steel and deteriorated the gypsum wallboard.

*Example 25*

Sheets of galvanized steel and of carbon steel were coated on one side with a resin-pitch composition similar to that used in Example 10 (Table II). The coating was applied by heating the metal sheets to about 210° to 250° C. and pressing a 0.010-inch thick extruded film of the resin-pitch composition onto the hot sheets by means of a roller press. It was demonstrated that these coated sheets could be sharply bent by means of a brake or rollformer without breaking or loosening the coating, because of its toughness, flexibility and adherence. After exposure of these coated sheets for 30 days at about 49° C. and 100% relative humidity, there was no evidence of loosening, weakening, or penetration of the coating on either the galvanized or carbon steel sheets.

It will be evident from the foregoing that my invention provides novel compositions comprising pitch and copolymers of ethylene and vinyl acetate, useful because of their desirable properties as coatings, moldings, extrusions, films, adhesives and the like.

Although I have disclosed herein the preferred practice of my invention, I intend to cover as well any change or modification therein which may be made without departing from the spirit and scope of the invention.

I claim:

1. A composition comprising from about 0.1% to about 75% by weight of the composition of a pitch of the class consisting of coal tar pitch and petroleum pitch having a ring-and-ball softening point from about 40° C. to about 190° C. in admixture with from about 99.9% to about 25% by weight of a resin comprising a copolymer of ethylene and vinyl acetate, said copolymer having a vinyl acetate content between 5% and 50% by weight and said copolymer having a melt index from about 0.2 to above about 1000, and the respective softening points of said pitch and resin being within a range of about 80° C.

2. A composition as defined in claim 1 characterized by said composition comprising finely-divided filler material.

3. A composition comprising from about 25% to about 75% by weight of the composition of a pitch of the class consisting of coal tar pitch and petroleum pitch having a ring-and-ball softening point from about 40° C. to about 190° C. in admixture with from about 75% to about 25% by weight of a resin composing a copolymer of ethylene and vinyl acetate having a vinyl-acetate content between about 5% and 50% by weight and said copolymer having a melt index from about 0.2 to above about 1000, and the respective softening points of said pitch and resin being within a range of about 80° C..

4. A composition comprising from about 25% to about 60% by weight of the composition of a coal tar pitch in admixture with from about 75% to about 40% by weight of a resin comprising a copolymer of ethylene and vinyl acetate having a vinyl-acetate content between about 18% and 40% by weight, a melt index between about 3 and 175 and the respective softening points of said pitch and resin being within a range of about 80° C.

References Cited

UNITED STATES PATENTS

| | | | |
|---|---|---|---|
| 2,361,418 | 10/1944 | Robinson | 260—27 |
| 3,128,261 | 4/1964 | Lane et al. | 260—28.5 |
| 3,177,164 | 4/1965 | Mills et al. | 260—2.5 |

FOREIGN PATENTS 602,582  5/1948  Great Britain.

MORRIS LIEBMAN, *Primary Examiner.*

J. A. GAZEWOOD, H. S. KAPLAN,
*Assistant Examiners.*